United States Patent [19]
Purdy et al.

[11] Patent Number: 5,726,660
[45] Date of Patent: Mar. 10, 1998

[54] PERSONAL DATA COLLECTION AND REPORTING SYSTEM

[76] Inventors: Peter K. Purdy, 411 Sunset Blvd., Port Townsend, Wash. 98368; Eugene F. Fowler, Jr., 721 Northill Dr., Richardson, Tex. 75080; Michael J. Cochran, 2505 Evans Dr., Plano, Tex. 75075

[21] Appl. No.: 566,299

[22] Filed: Dec. 1, 1995

[51] Int. Cl.$^6$ ............................................. G01S 5/02
[52] U.S. Cl. ................................. 342/357; 342/352
[58] Field of Search ........................ 342/357, 352; 364/420, 449

[56] References Cited

U.S. PATENT DOCUMENTS

| | | | |
|---|---|---|---|
| 5,124,915 | 6/1992 | Krenzel | 364/420 |
| 5,311,197 | 5/1994 | Sorden et al. | |
| 5,389,934 | 2/1995 | Kass | 342/357 |
| 5,422,813 | 6/1995 | Schuchman et al. | |

OTHER PUBLICATIONS

"Wearable Computer Used in Bosnia", John Rhea, M&AE, Jul. 1996, vol. 7, No. 7.
"Wearable Computer Reduces Costs in Nuclear Power Plants", Copyright 1995, 1996, IntuMedia Works, Ltd.
"The European Context for Assistive Technology", Proceedings of the 2nd TIDE Congress 26–28 Apr., 1995, Paris, I. Placencia Porrero and R. Puig de la Bellacasa.

*Primary Examiner*—Thomas H. Tarcza
*Assistant Examiner*—Dao L. Phan
*Attorney, Agent, or Firm*—Gregory M. Howison

[57] ABSTRACT

A personal data unit (PDU) is operable to collect video information via a camera (12) and audio information via a microphone (14). The PDU (10) utilizes a cellular link for transmission of the collected information to a central station (27). Position/time information is received from a GPS satellite network (22) via an antenna (24). This allows the system to be packaged such that it can be attached to an individual and carried with that individual.

17 Claims, 6 Drawing Sheets

PERSONAL DATA COLLECTION AND REPORTING SYSTEM

TECHNICAL FIELD OF THE INVENTION

The present invention pertains in general to data collection systems and, more particularly, to a dam collection system that is operable to be placed on a person to collect video, audio, time and position information and relay it back to a central station.

Background of the Invention

Data collection systems that are associated with a person have been implemented in the past for various purposes, such as medical monitoring systems and other types of personal data collection systems. These systems have tended in the past to be bulky and they are for relatively specific purposes. As technology has advanced, electronic circuitry has decreased in size and afforded an individual a great deal of functionality. One result of this is the mini-camera utilizing CCD technology which can be utilized for monitoring purposes. These small cameras have been utilized for covert undercover work and have been incorporated into such things as briefcases and even into coat lapels.

One technique for collecting data that has been utilized by the security industry is that wherein voice and video are retrieved from a fixed location and forwarded to a central monitoring station. This allows the central monitoring station to call up the remote location and receive both video and audio information from that remote location for the purposes of monitoring the premises. In recent developments, the video information and audio information have been implemented on squad cars for various police departments to record through the windshield traffic stops, this information either stored in the vehicle or transmitted to a central location, typically the information being stored in the vehicle and later put into archives.

With respect to location, with the advent of the Global Positioning System (GPS), it has been possible to provide relatively inexpensive location systems for determining the location of a moving object. These have typically been utilized on trucks for companies having large fleets. The position is determined from a satellite receiver, which position can then be stored or can be transmitted to a central receiving station via a wireless link. Further, the wireless link can be a two-way communication link wherein the positioning information is only transmitted in response to receiving a request.

None of the above systems have combined the use of video, audio and positioning in a portable unit. A number of solutions have been attempted, such as that disclosed in U.S. Pat. No. 5,389,934, issued to Kass which allows voice communications only after activation by a telephone call to a unit. A similar capacity is provided in GB 2,270,405 and JP 630,218A. Another technique is disclosed in U.S. Pat. No. 5,334,974, issued to Daniel et al., wherein a method for transmitting emergency data from a mobile unit is described, wherein individual data is transmitted to a remote site and position information is superimposed on a map of the area. In U.S. Pat. No. 5,235,633, GPS location data are utilized for cellular telephone cell use optimization, while U.S. Pat. No. 5,317,323 utilizes a GPS system to facilitate location of a mobile cellular radio system.

SUMMARY OF THE INVENTION

The present invention disclosed and claimed herein comprises a personal data collection unit. The personal data collection unit includes a video camera and an audio transducer. The video camera is operable to receive video information from a local scene and convert this into a video signal that is capable of being transmitted over a telephone communication link. The audio information is also received and converted to an audio signal capable of being transmitted over the telephone communication link. Additionally, a satellite receiver is provided for receiving satellite signals from a Global Positioning System which are operable to contain information associated with time and location. These are converted to a signal capable of being transmitted over the telephone communication link. A cellular telephone module is provided for receiving the video signal, audio signal and satellite signals and transmitting them over a telephone communication link. A processor controls the overall operation of the system such that it can be activated in response to a user input and collect information from the satellite receiver, the video camera and the audio transducer and operate the cellular telephone module to transmit this information to a remote location. A memory is provided for temporarily storing this information.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
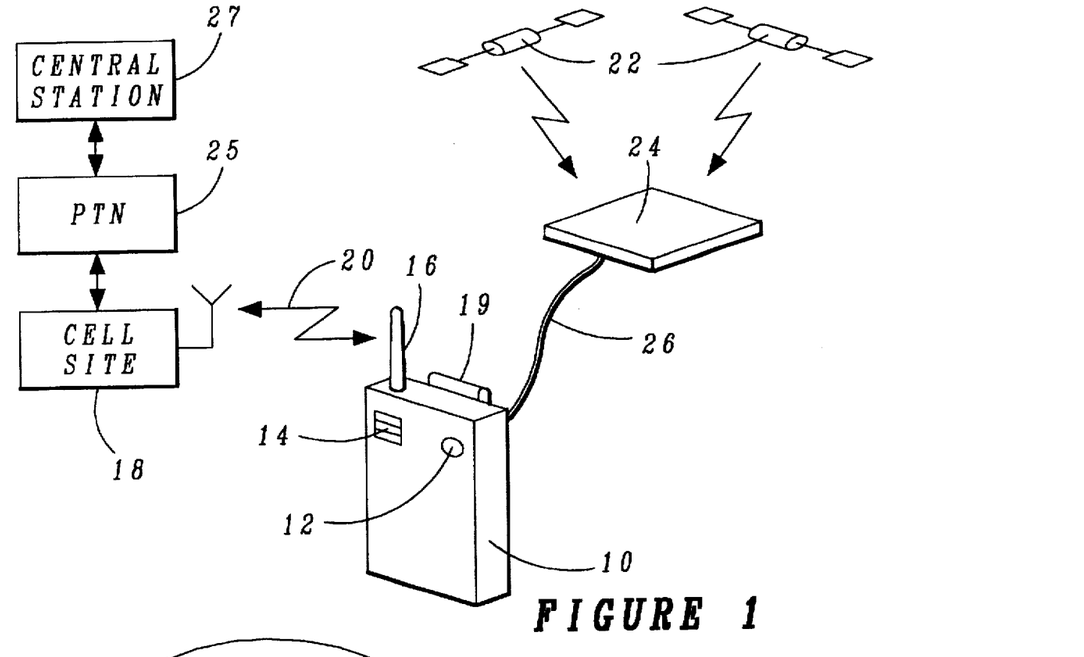
FIG. 1 illustrates an overall respective view of the package utilized with the present invention.

Referring now to FIG. 1, there is illustrated a perspective view of the packaging system for the present invention. The system is comprised of a personal data collection unit 10 (PDU) which has associated therewith a camera 12 and microphone 14. Internal to the PDU 10 is a cellular telephone which interfaces with a cellular telephone antenna 16 to communicate over a wireless link 20 with a cell site 18 in a conventional manner associated with CCITT protocol. The cell site 18 is interfaced with a public telephone network (PTN) 25. This allows the cell site 18 to contact a central station 27 for transfer of collected information thereto. Therefore, the PDU 10 is operable to collect audio information via the microphone 14 and video information via the camera 12. A clip 19 on the back of the PDU 10 allows the PDU 10 to be attached to clothing or the such, wherein the camera 12 can be directed at any particular location.

In addition to the microphone 14 and the camera 12, time and position information is collectable via an internal GPS receiver. The GPS receiver, as is well known in the art, is operable to receive time and position information from a network of satellites 22 that are positioned geosynchronously over the earth. A patch antenna 24 is utilized that is a small rectangular or square antenna surface that must be aimed up at substantially the correct angle required to receive signals from the multiple satellites 22. Due to the small signal levels involved with satellite communications, it is important that this be positioned correctly to insure that the signal/noise ratio is maximized.

The patch antenna 24 will typically be remotely disposed with respect to the PDU 10 and connected thereto with a cable 26. Typically, the PDU 10 will be disposed on the lapel and the patch antenna 24 will be disposed on the shoulder or some location that allows the patch antenna 24 to communicate with the satellites 22. This therefore allows the PDU 10 to accumulate time and position information, in addition to the audio information from the microphone 14 and the video information from the camera 12.

Figure 2:
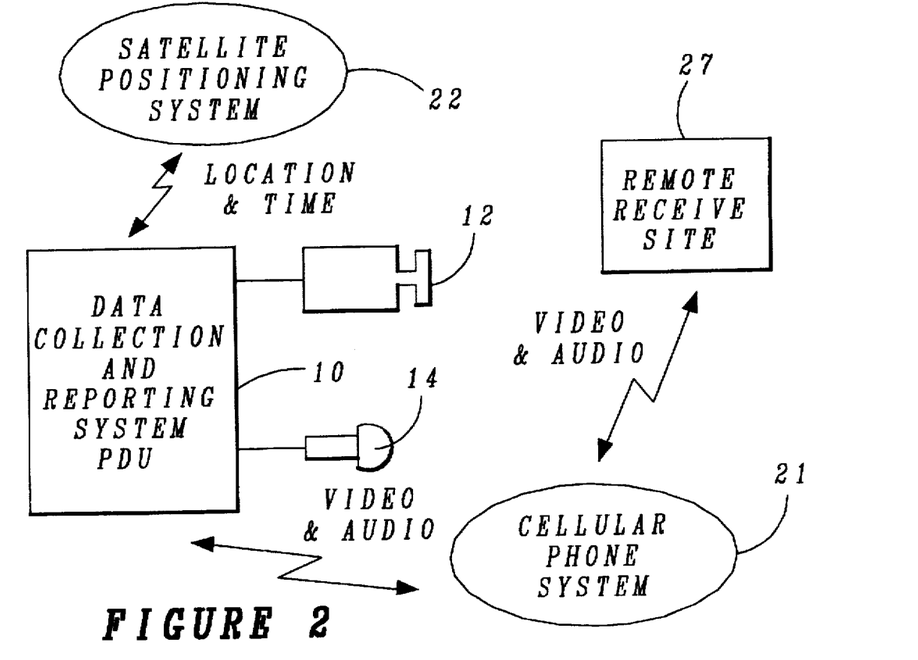
FIG. 2 illustrates a diagrammatic view of the system of the present invention.

Referring now to FIG. 2, there is illustrated a diagrammatic view of the overall system of the present invention. The satellite positioning system 22 is operable to transmit the location and time information to the PDU 10, which PDU 10 is also operable to interface with the camera 12 and the microphone 14. The video, audio and positioning information is then transmitted over the wireless link to the cell system 21 which is then transmitted in some manner to the central station 27, the central station 27 having a recording capability and a monitoring capability. As described above, this is typically facilitated with the public telephone network 25.

Figure 3:
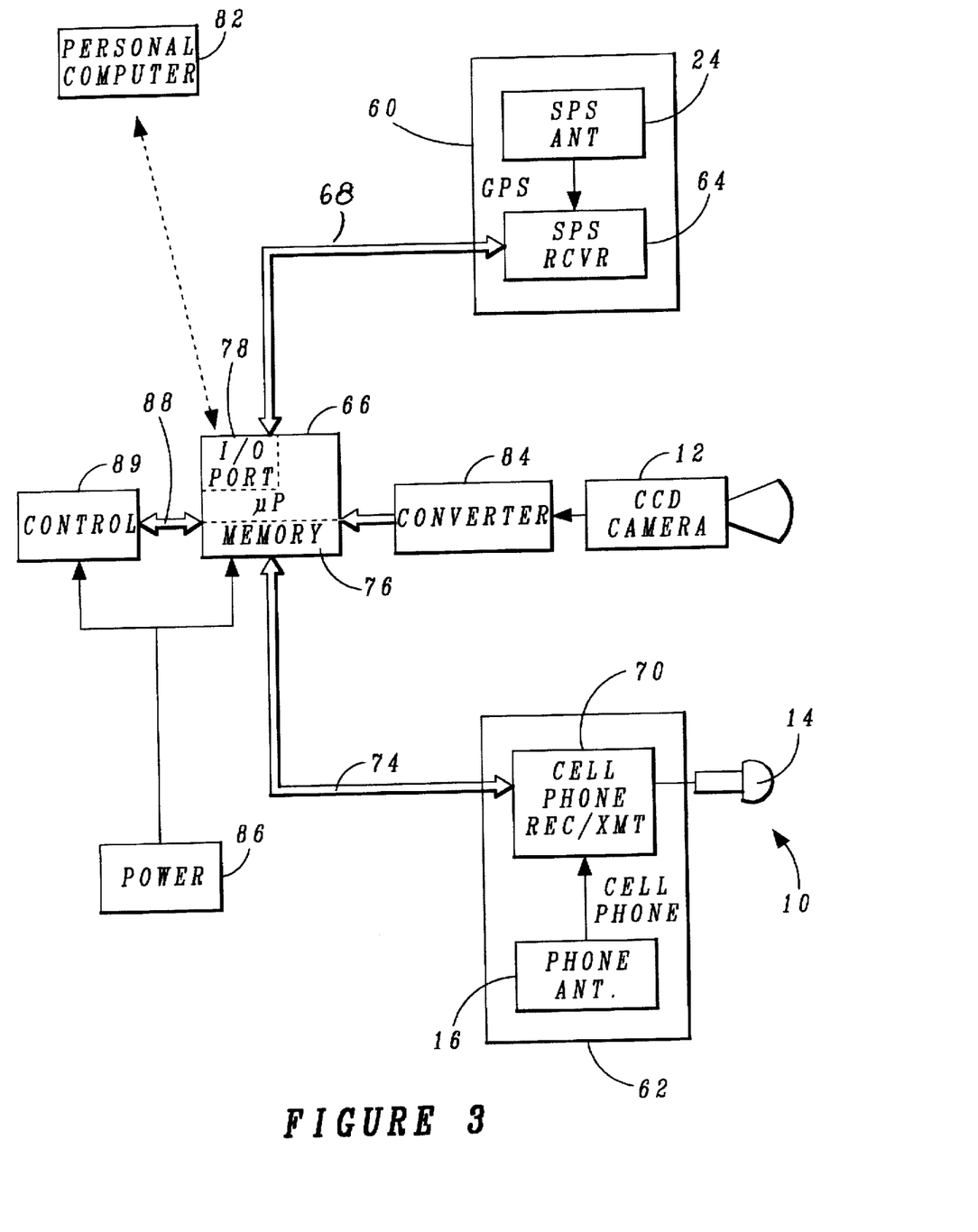
FIG. 3 illustrates a block diagram of the system of the present invention.

Referring now to FIG. 3, there is illustrated a block diagram of the data collecting system of the present invention. The PDU 10 is comprised of a GPS section 60 and a cellular telephone section 62. The GPS section 60 has associated therewith the patch antenna 24 and a GPS receiver 64. The GPS receiver 64 is interfaced with a microprocessor 66 (CPU) through a control/data/address bus 68. Similarly, the cell telephone unit 62 incorporates the cell antenna 16 and a cell phone receive/transmit unit 70, this being a conventional system. This is interfaced with the CPU 66 through a control/address/data bus 74. A memory 76 is provided for the CPU 66, which is operable to store data and is also operable to contain instructions for the operation of the CPU 66. The CPU 66 has included therein an input/output (I/O) section 78 which provides an I/O port for interface with the CPU 66. This is utilized to interface with an external personal computer 82 for monitoring and such. A control section 89 is provided which is interfaced through a control bus 88 to the CPU 66, this providing the general timing and control signals necessary to run the system.

The CCD camera 12 is attached to a converter 84 which is operable to convert the video information for transmittal to the CPU 66, for processing and storage thereof. Typically, this will be converted into a video compatible signal for transmittal over the cellular communication link in real time. However, the memory 76 could be of such a size that all or a portion of the data could be buffered. However, at the present time, this requires a significantly large amount of memory and the preferred embodiment is to transmit in real time. Therefore, the CPU 66 merely relays converted video information to the cellular section 62 for transmittal via the antenna 16 to the cellular communication link. The entire system is powered by a power supply circuit 86, which is typically a battery operated system.

Figure 4:
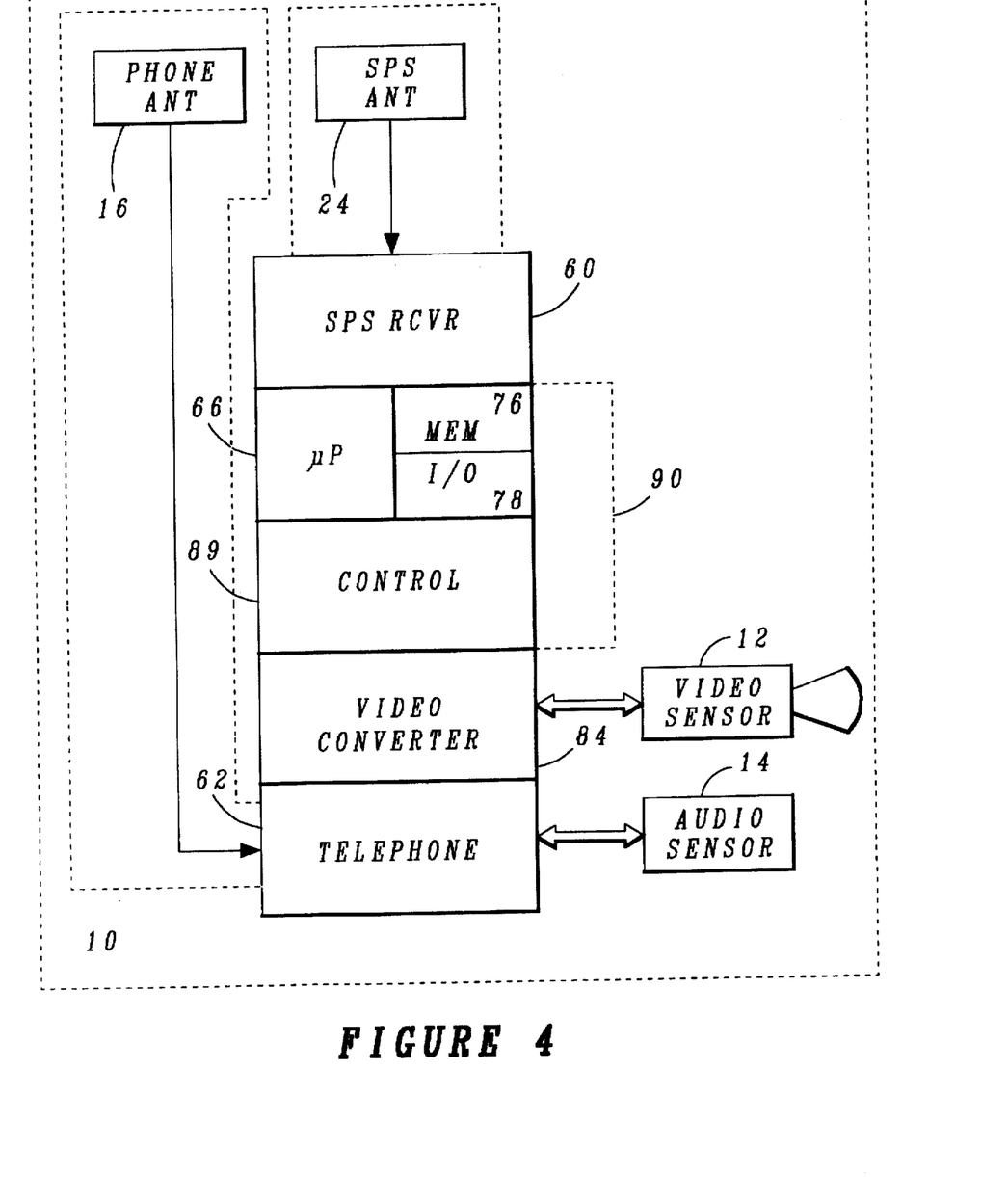
FIG. 4 illustrates a more detailed block diagram of the central unit associated with the system of the present invention.

Referring now to FIG. 4, there is illustrated a general layout of the PDU 10. The entire system is formed into a single integrated circuit wherein the functions of the satellite signal receiving section 60, the cellular telephone section 62, the signal conditioning sub-system 90 and the video processing sub-system 84 are combined. By utilizing such an arrangement, a significant number of individual components can be eliminated and the cost of manufacturing significantly reduced.

Figure 5:
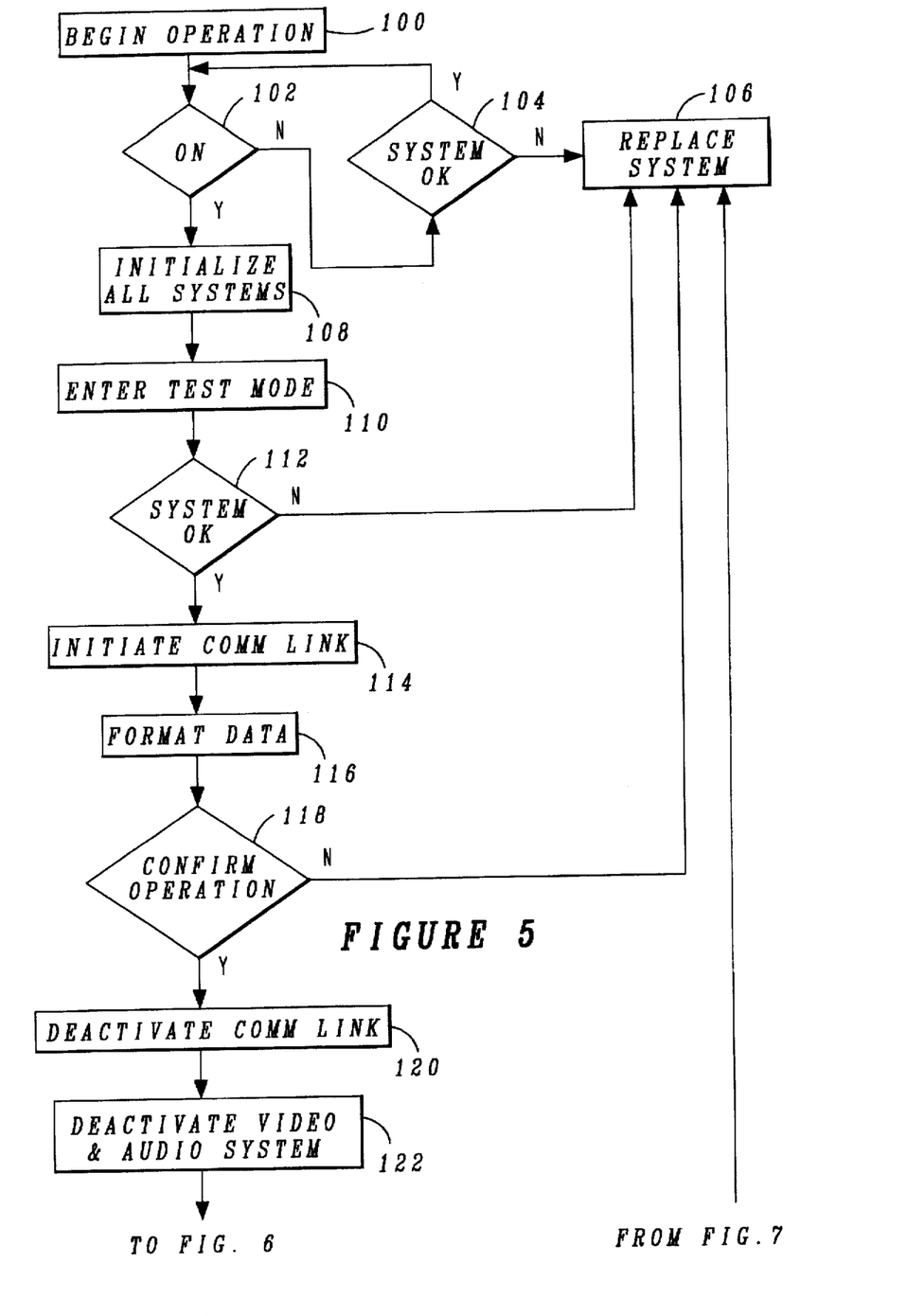
FIGS. 5–7 illustrate flowcharts depicting the operation of the present invention.
Figure 6:
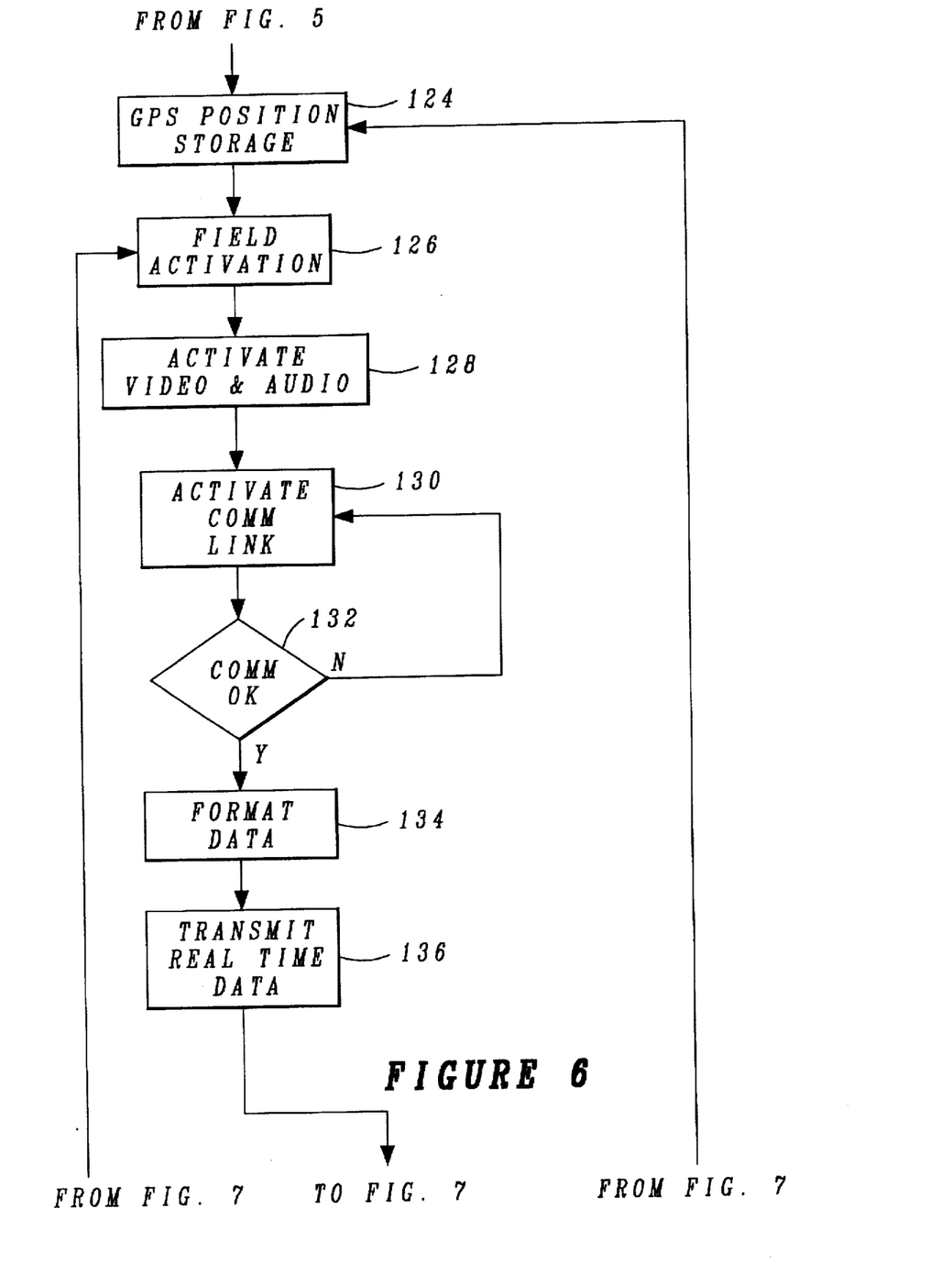
Figure 7:
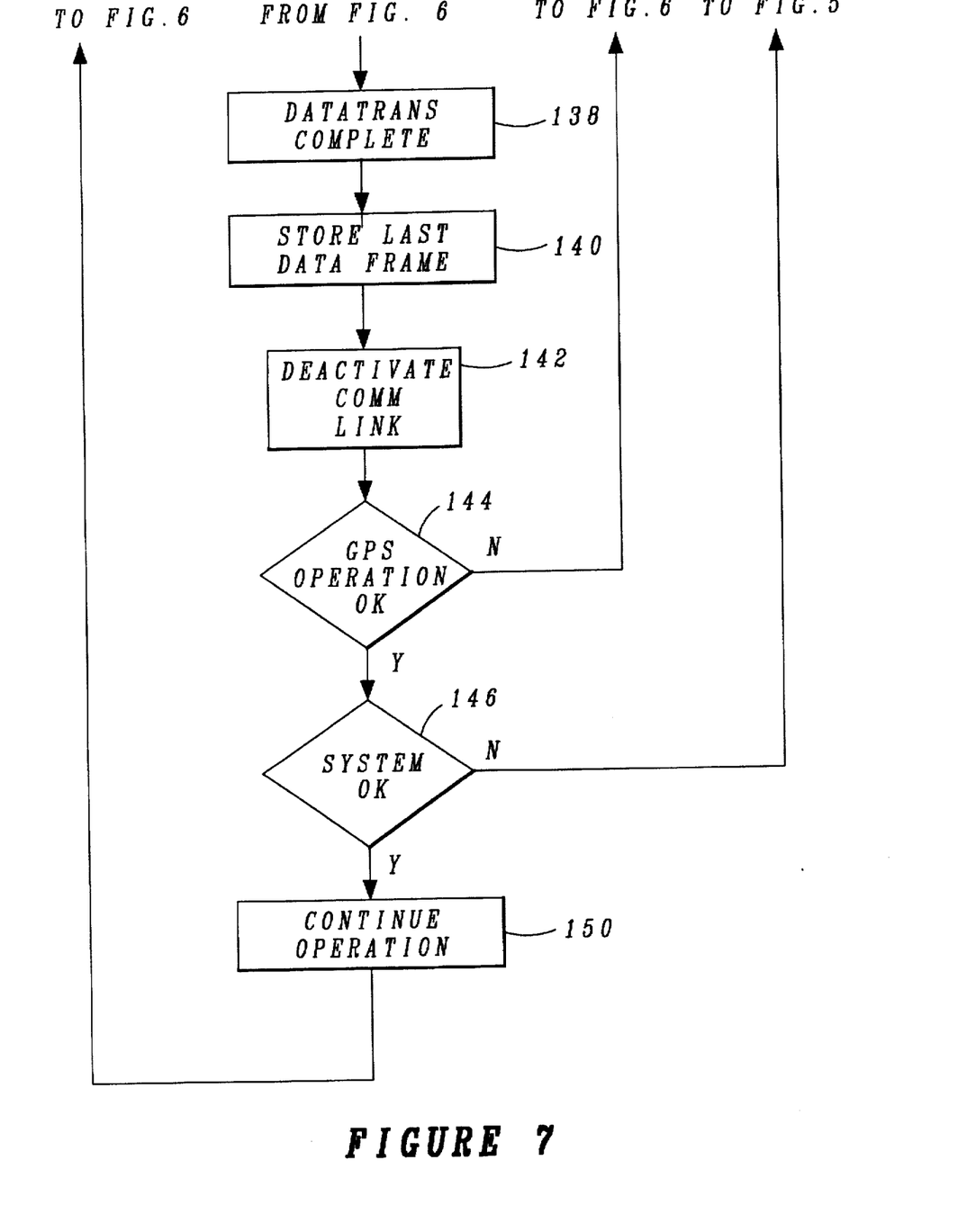

Referring now to FIGS. 5–7, there is illustrated a flowchart depicting the operation of the present invention. The operation is initiated at a block 100 and then proceeds to a decision block 102 to determine if the system is on. The initiation operation can begin with the depression of a mechanical switch by the user or it could be activated by a remote link, there being a local receiver required to receive this remote access signal from the accessing location.

If the system is not on, the program flows along an "N" path to a decision block 104 to determine if the system is ok. If not, the program will flow to a function block 106 along an "N" path which indicates that the system must be replaced, as it is faulty. If the system is still ok and is merely not on, the program will flow back to the input of decision block 102. When the system is determined to be on, the program will flow from decision block 102 to a function block 108 to initialize all systems and then to a function block 110 to enter a test mode. The program will then flow to a decision block 112 to determine if the system has passed the test mode. If not, the program will flow along an "N" path to the function block 106 and, if so, the program will continue and flow to a function block 114 to initiate a communication link. The program will then flow to a function block 116 to format the data in the appropriate format for transmission, this being the point that real time data such as audio and video is received and then transmitted.

After the data is formatted, the program flows to a decision block 118 to confirm the operation, i.e., determine that the data has been transmitted. If the operation has not been confirmed, the program will flow along an "N" path to function block 106 and, if it has been confirmed, the program will flow along a "Y" path to a function block 120 wherein the communication link will then be deactivated and then to a function block 122 wherein the video and audio system will be deactivated. This is an operation whereby the overall system operation is checked prior to full operation. The program then flows to a function block 124 to access the positional information that is stored. Typically, the positional information must be stored, as it may not be always possible to have a valid link with the GPS satellite network 22. Once the GPS information is received, the program will flow to a field activation function block 126 and then to a function block 128 to activate the video and audio and then to a function block 130 to activate the communication link. The program flows to a decision block 132 wherein a determination is made as to whether the communication link is ok. The program will flow along an "N" path back to the function block 130 until a communication link is achieved and then to a function block 134 to again format data. The program then flows to a function block 136 to transmit the real time data.

Once the real time data is transmitted, the program will then flow to a function block 138 to complete the transmission of data, this either at the end of a predetermined time or in response to an external stimulus such as depression of a switch. The program will then flow to a function block 140 to store a last data frame and then to a function block 142 wherein the communication link is deactivated. The program will then flow to a decision block 144 to determine if the GPS operation is ok. If not, the program will flow back to the function block 124 to again determine if GPS information is available and store this information. If the GPS operation is ok, then the program will flow along a "Y" path to a decision block 146 to determine if the system is ok. If not, the program will flow along a "N" path to function block 106 and, if it is ok, the program will flow along a "Y" path to a function-block 150 to continue the operation and return to function block 126 to again activate the field or the overall system.

In summary, there has been provided a personal data collection unit for collecting video, audio and position/time information about an individual. The personal data collection unit is operable to be disposed on the individual such that the individual can carry it with him and, in a hands-free operation, collect the information and, in real time, transmit it via a wireless communication link back to a central monitoring/collection station.

Although the preferred embodiment has been described in detail, it should be understood that various changes, substitutions and alterations can be made therein without departing from the spirit and scope of the invention as defined by the appended claims.

What is claimed is:

1. A personal data collection unit, comprising:
   a video camera for collecting pictures of a local scene proximate to said personal data collection unit, said video camera providing video data in a conventional format to a converter device, said converter device operable to process said video data as analog video data which can be transmitted over a telephone communication link;
   a satellite positioning system receiver actuated by the user which receives first signals from a satellite system and processes said first signals into a form which can be transmitted over said telephone communication link;
   a cellular telephone module for sending and receiving second signals over said telephone communication link, said cellular telephone module operable to receive said processed satellite signals and said video data and transmit them over said telephone communication link;
   a processor for managing the operation of said cellular telephone module and said satellite positioning system receiver;
   a memory for storing said video data derived from said video camera and said satellite system;
   a housing for containing said video camera, said satellite positioning system receiver, said cellular telephone module, said processor and said memory, said housing being selectably attachable to a user with said video camera positioned to said viewing area;
   a patch antenna for receiving said first signals from said satellite system;
   a communication cable connecting between said patch antenna and said satellite positioning system receiver for carrying said first signals from said patch antenna to said satellite positioning system receiver; and
   wherein said patch antenna is attachable to the user and positioned in such a manner that said patch antenna is upwardly oriented toward said satellite system to maximize reception therefrom, with said communication cable being flexible and of such a length to allow independent positioning of said housing for optimal viewing of said viewing area and said patch antenna for maximum reception of said first signals from said satellite system.

2. An autonomous personal data collection and reporting system, comprising:
   a portable unit for communicating with a remote location to transmit contemporaneous data and information;
   said portable unit having a video camera for collecting pictures of the local scene, said video camera providing video data to a converter device which processes said video data for transmission over a communication link, wherein said portable unit has a satellite positioning system receiver actuated by the user which receives first signals from said satellite system and processes said signals into a form which can be transmitted to said remote location over said communication link, said portable unit has a cellular telephone module for sending and receiving second signals over said communication link, said portable unit has a microprocessor which manages unit functions by executing pro-loaded digital instructions, said microprocessor has a memory unit for storing data derived from said video camera, said satellite system, and said cellular telephone module;
   a housing for containing said video camera, said satellite positioning system receiver, said cellular telephone module, said microprocessor and said memory, said housing being selectably attachable to a user with said video camera positioned to said viewing area;
   a patch antenna for receiving first signals from said satellite system;
   a communication cable connecting between said patch antenna and said satellite positioning system receiver for carrying said received first signals from said patch antenna to said satellite positioning system receiver; and
   wherein said patch antenna is attachable to the user and positioned in such a manner that said patch antenna is upwardly oriented toward said satellite system to maximize reception therefrom, with said communication cable being flexible and of such a length to allow independent positioning of said housing for optimal viewing of said viewing area and said patch antenna for maximum reception of said first signals from said satellite system.

3. An autonomous personal data collection and reporting system, comprising:
   a portable unit suitable for communicating with a remote location to transmit contemporaneous video and audio information;
   wherein said portable unit has a video camera for collecting pictures of a viewing area, said video camera providing video data to a converter device which processes said video data for transmission over a communication link, said portable unit having a satellite positioning system receiver which receives first signals from satellites indicative of the location of said portable unit and the time of day, said portable unit having a voice module for receiving operator voice signals and transmitting said operator voice signals over said communication link, said portable unit having a microprocessor which controls the unit operation by execution of a pre-loaded set of instructions, said portable unit having a local control unit wherein, said local control unit is actuated by tactile deflection of an actuating device such as a switch or by the receipt of sound signals, or by physical displacement of axis, or by activation of an accelerometer, or by periodic initiation signals supplied by the microprocessor, the, said microprocessor having a memory unit for storing digital data derived from said video camera, said satellites, and the voice module;
   a patch antenna which is wearable upon the user, such that it is aimed up at substantially the correct angle required to receive signals from said satellite and apply said signals to said satellite positioning system receiver.

a housing for containing said video camera, said satellite positioning system receiver, said voice module, said microprocessor and said memory, said housing being selectably attachable to a user with said video camera positioned to said viewing area;

said patch antenna for receiving said first signals from said satellite;

a communication cable connecting between said patch antenna and said satellite positioning system receiver for carrying said first signals from said patch antenna to said satellite positioning system receiver; and wherein said patch antenna is attachable to the user and positioned in such a manner that said patch antenna is upwardly oriented toward said satellite to maximize reception therefrom, with said communication cable being flexible and of such a length to allow independent positioning of said housing for optimal viewing of said viewing area and said patch antenna for maximum reception of said first signals from said satellite.

4. An autonomous personal data collection and reporting system in accordance with claim 3, wherein said memory unit contains a time-stamped record of the latitude and longitude information transmitted during use.

5. An autonomous personal data collection and reporting system comprising:

a portable unit suitable for communicating with a remote location to transmit contemporaneous video and audio information;

said portable unit having a video camera for collecting pictures of a viewing area, said video camera providing video data to a converter device which processes said video data for transmission over a cellular telephone network communication link;

said portable unit having a satellite positioning system receiver which receives first signals from satellites indicative of the location of said portable unit and the time of day;

said portable unit having a cellular telephone module for sending and receiving second signals over a cellular telephone network communication;

said portable unit having a microprocessor which controls said portable unit operation by a pre-loaded set of digital instructions, said pre-loaded set of digital instructions being accessible through an I/O port;

wherein said microprocessor has a memory unit for storing said digital instructions for use by said microprocessor, and for storing digital data derived from said video camera, a satellite system and a local control unit;

wherein said local control unit is actuated by tactile deflection of an actuating device such as a switch or by the receipt of sound signals, or by physical displacement of axis, or by activation of an accelerometer, or by periodic initiation signals supplied by the microprocessor;

wherein said memory unit is a non-volatile memory storing at least one frame of said video data;

wherein said I/O port is accessible to a personal computer for operator initiated, two way local communication between said portable unit and said personal computer;

a patch antenna which is wearable upon the user, such that it is aimed up at substantially the correct angle required to receive signals from said satellite system and apply said signals to said satellite positioning system receiver;

a housing for containing said video camera, said satellite positioning system receiver, said cellular telephone module, said microprocessor and said memory, said housing being selectably attachable to a user with said video camera positioned to a viewing area;

said patch antenna for receiving said first signals from said satellite system;

a communication cable connecting between said patch antenna and said satellite positioning system receiver for carrying said received first signals from said patch antenna to said satellite positioning system receiver; and wherein said patch antenna is attachable to the user and positioned in such a manner that said patch antenna upwardly oriented toward said satellite system to maximize reception therefrom, with said communication cable being flexible and of such a length to allow independent positioning of said housing for optimal viewing of said viewing area and said patch antenna for maximum reception of said first signals from said satellite system.

6. An autonomous personal data collecting and reporting system in accordance with claim 5, further including a power source.

7. An autonomous personal data collecting and reporting system in accordance with claim 6, further including a sensor for receiving sound in waves.

8. The autonomous personal data collecting and reporting system in accordance with claim 1, wherein said patch antenna comprises a rectangular antenna surface.

9. The autonomous personal data collecting and reporting system in accordance with claim 1, further comprising a clip for mounting the personal data collecting and reporting system to the clothing of the user.

10. The autonomous personal data collecting and reporting system in accordance with claim 1, wherein said patch antenna is mounted to the user's shoulder.

11. The autonomous personal data collecting and reporting system in accordance with claim 2, wherein said patch antenna is mounted to the user's shoulder.

12. The autonomous personal data collecting and reporting system in accordance with claim 11, wherein said patch antenna comprises a square antenna surface.

13. The autonomous personal data collecting and reporting system in accordance with claim 3, wherein said patch antenna is mounted to the user's shoulder.

14. The autonomous personal data collecting and reporting system in accordance with claim 13, wherein said patch antenna comprises a rectangular antenna surface.

15. The autonomous personal data collecting and reporting system in accordance with claim 5, wherein said patch antenna is mounted to the user's shoulder.

16. The autonomous personal data collecting and reporting system in accordance with claim 15, wherein said patch antenna comprises a rectangular antenna surface.

17. The autonomous personal data collecting and reporting system in accordance with claim 16, further comprising a clip for mounting the personal data collecting and reporting system to the clothing of the user.

* * * * *